Figure 1:
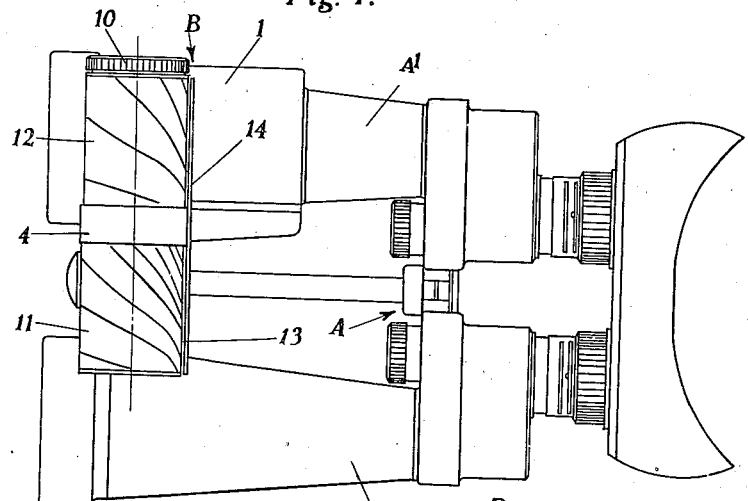

Nov. 11, 1941.  J. W. FRENCH  2,262,100

OPTICAL OBSERVATION INSTRUMENT

Filed June 29, 1940

Inventor
James Weir French
by E. H. Bond
Attorney

Patented Nov. 11, 1941

2,262,100

UNITED STATES PATENT OFFICE 2,262,100

OPTICAL OBSERVATION INSTRUMENT

James Weir French, Anniesland, Glasgow, Scotland, assignor to Barr and Stroud, Limited, Anniesland, Glasgow, Scotland Application June 29, 1940, Serial No. 343,289
In Great Britain May 31, 1939

5 Claims. (Cl. 88—2.7)

This invention refers to optical observation instruments of the kind intended normally to be carried in the hand or hands of the observer and not ordinarily adapted for measuring purposes, i. e. instruments such as binoculars and monoculars, and the object of the invention is to provide an instrument of this sort with means for effecting accurate estimation of range of the object under observation (hereinafter referred to as the target) without impairing to any appreciable extent the properties ordinarily associated with such instruments, for example, lightness in weight, compactness, and the ability to use the instrument without making measurements.

According to this invention, an instrument of the kind referred to includes a prism arrangement in its optical system whereby the normal image-forming beam of light, or one of such beams of light, is divided, one part, which does not pass through the prism arrangement, forming one image of the target in the field of view, say a normal image, and another part, which does pass through the prism arrangement, forming a secondary image of the target in the field of view, together with means for moving the said prism arrangement so as to enable the secondary image to be set relative to the normal image, and a scale arrangement whereby, from such setting and certain known or assumed data, there are obtainable readings of range of target.

In carrying the invention into practice, division of the beam of light is effected by a prism of annular form coaxial with and rotatable about the optical axis of the beam, or by a pair of such prisms placed near to one another and rotatable in opposite senses simultaneously and by equal amounts about that axis, the secondary image being formed by light passing through the annular prism or prisms and the normal image by light passing through the central opening in the prism or prisms, and displacement and setting of the secondary image being effected by the rotation of the prism or prisms. Where there is a single annular prism, the secondary image is displaced in a circular path, and, where there are two prisms, that image is displaced in a rectilinear path.

The annular prism (or prisms) may constitute a permanent element in the construction of the instrument, being situated within the tubular body of the instrument, or the prism (or prisms) may form part of a fitting which is removably attachable to the instrument body.

Preferably provision is made whereby the prism arrangement for dividing the light can be moved completely out of the path of the light reaching the eye without being removed from the instrument, so leaving a normal field of view for the observer.

The instrument may be calibrated for use with a known or assumed value of some dimension of the target, say its height, the secondary image being set to the appropriate height on the normal image. Alternatively, the instrument for use at sea may be calibrated to base its measurement upon the known height of the observer above datum, the instrument being set by bringing the horizon of the secondary image into appropriate relationship with the target in the normal image, or the instrument may be designed for operation in accordance with both of the foregoing methods. Further, if the range of target is known, estimation of a target dimension can be effected.

The invention will now be described with reference to the accompanying drawing, in which—

Figure 2:
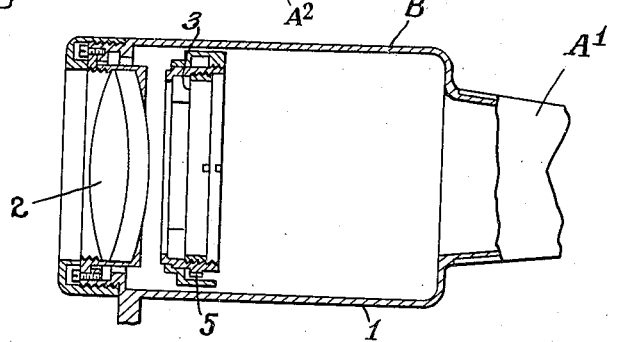
Figure 4:
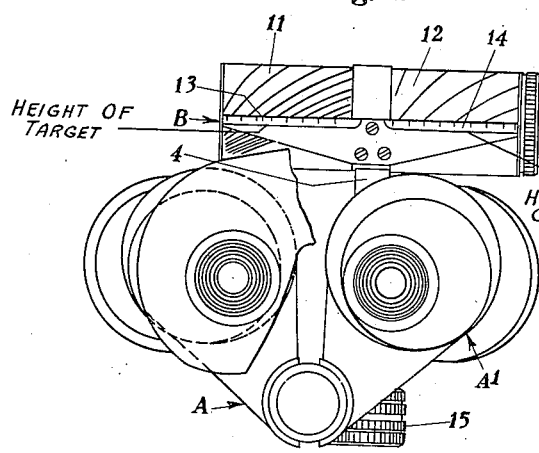
Figure 3:
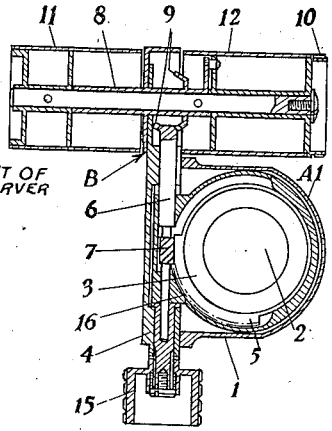

Figure 1 is a plan view of a prismatic binocular instrument fitted in one limb for range estimation in accordance with the invention, Figure 2 is a longitudinal section of the object end of that limb of the instrument which is fitted with the range estimating device, Figure 3 is a transverse sectional view of that limb and of the range estimating device, and Figure 4 is an end view of the binocular instrument as seen from the eyepiece end.

In the drawing A denotes the binocular instrument and B the range estimating device applied to one limb $A^1$ thereof, the instrument apart from the device B being of standard prismatic construction.

The tubular casing of the limb $A^1$ is cut short and the device B applied thereto. The device B comprises a casing 1 containing an objective 2 similar to the objective of the other limb $A^2$, and an annular prism 3. From the casing 1 there extends laterally a carrier or bracket 4 which carries mechanism for effecting movement of the annular prism 3.

The annular prism 3 is mounted in a holder 5 which is rotatable about the optical axis. The operating mechanism, see Figure 3, comprises a shaft 6 extending through the bracket 4, a worm 7 on the shaft 6 engaging with a toothed rim on the prism holder 5, a transverse shaft 8, bevel gears 9 connecting the shafts 8 and 6, a milled head 10 with which the shaft 8 is rotatable, two scale drums 11 and 12 rotatable with the shaft 8 and graduated in range values, a stationary scale bar with two sets of scale markings 13 and 14, and a second head 15 below the bracket 4. In order to eliminate the difference in focus between the normal image and secondary image, a small curvature may be given to one or more of the prism surfaces.

The observer looking through the binocular instrument sees in the field of view two images of the target, viz. a normal image formed by the light passing through the circular opening in the annular prism 3 and a secondary image formed by the light which passes through the glass of the prism 3. By turning the head 10, the observer can rotate the prism 3 and thereby displace the secondary image in the field of view. In, for example, the case of a target which is a ship and assuming that the height between the water line and the funnel top of the target is known, the observer brings the water line of the secondary image on to the funnel top of the normal image, and then reads off on the range scale 11 the range value appearing against the known target height value on the scale 13.

An alternative method of using the range estimator is by referring to the horizon, in which case it is assumed that the observer's height above datum, say above water level, is known. In this case the observer turns the annular prism 3 so as to bring the horizon of the secondary image into coincidence with the water line of the normal image. He then reads off the range value on the scale 12 against his known height on the scale 14.

The prism 3 and its holder 5 are carried by a support 16 which is movable as a whole about the axis of the shaft 6 by means of the head 15, so that the prism 3 can be swung through a right angle out of the observer's line of sight.

It will be appreciated that a device as shown could be used to make measurements in planes other than the vertical, for example, in the horizontal direction. For this purpose the device is turned from the position illustrated, say, through 90°, about the optical axis, in which case, instead of height of target being used as a base of measurement, a horizontal dimension, for instance, length of the target, is used. Further, if when observing, say a ship at sea at a known range, the estimated horizontal base length differs from what the base length is known to be, it may be assumed that the ship observed is moving in a path which is not at right angles to the line of sight, and from the estimated and known base lengths the course of the ship may be determined.

Each of the two limbs of a binocular instrument may be fitted with an annular prism or pair of prisms, the two prisms or pairs of prisms being rotatable together from a common operating head.

I claim:

1. An optical observation instrument of the hand-carried type having a telescope optical system to form an image of a distant object by light received through an entrance aperture, and provided with range estimating means comprising a prism of annular form located in, but occupying part only of the transverse area of, the path of the light which has entered through the entrance aperture, the said prism being rotatable about the axis of the optical system, mechanism for rotating said prism so as to displace and set the secondary image, formed by that portion of the light which passes through the prism, relatively to the normal image formed by the portion of the light which passes through the circular opening of the prism, and a scale arrangement including members which are relatively movable with the prism, one scale member being graduated in accordance with range values and the other bearing graduations corresponding with another element of the triangle of measurement.

2. A binocular optical observation instrument of the hand-carried type having two telescope optical systems to form images of a distant object by light received through entrance apertures and provided with range estimating means comprising a prism of annular form located in, but occupying part only of the transverse area of, the path of the light which has entered through one of the entrance apertures, the said prism being rotatable about the axis of the optical system, mechanism for rotating said prism so as to displace and set the secondary image, formed by that portion of the light which passes through the prism, relatively to the normal image formed by the portion of the light which passes through the circular opening of the prism, and a scale arrangement including members which are relatively movable with the prism, one scale member being graduated in accordance with range values and the other bearing graduations corresponding with another element of the triangle of measurement.

3. An optical observation instrument of the hand-carried type having a telescope optical system to form an image of a distant object by light received through an entrance aperture and provided with range estimating means comprising a prism of annular form located in, but occupying part only of the transverse area of, the path of the light which has entered through the entrance aperture, said prism being rotatable about the axis of the optical system, mechanism for rotating said prism so as to displace and set the secondary image, formed by that portion of the light which passes through the prism, relatively to the normal image formed by the portion of the light which passes through the circular opening of the prism, an operating head operable by the observer for actuating said mechanism, and a scale arrangement including a drum graduated in accordance with range values and movable with the mechanism aforesaid, and a stationary set of graduations corresponding with another element of the triangle of measurement.

4. A binocular optical observation instrument of the hand-carried type having two telescope optical systems to form images of a distant object by light received through entrance apertures and provided with range estimating means comprising a prism of annular form located in, but occupying part only of the transverse area of, the path of the light which has entered through one of the entrance apertures, the said prism being rotatable about the axis of the optical system, mechanism for rotating said prism so as to displace and set the secondary image, formed by that portion of the light which passes through the prism relatively to the normal image formed by the portion of the light which passes through the circular opening of the prism, an operating head operable by the observer for actuating said mechanism, and a scale arrangement including a drum graduated in accordance with range values and movable with the mechanism aforesaid, and a stationary set of graduations corresponding with another element of the triangle of measurement.

5. An optical observation instrument according to claim 1 embodying a mounting which carries the prism of annular form, which mounting is angularly movable in the instrument about an axis tangential to the prism, to enable the prism to be swung out of the light path altogether.

JAMES WEIR FRENCH.